United States Patent
Herczog et al.

(10) Patent No.: US 7,689,246 B2
(45) Date of Patent: Mar. 30, 2010

(54) WIRELESS COMMUNICATION DEVICE USING A SINGLE CLOCK SIGNAL AND METHOD OF OPERATING THE SAME

(75) Inventors: Eugéne Pascal Herczog, Teversham (GB); Nigel Gow Paton, Balsham (GB)

(73) Assignees: MStar Semiconductor, Inc. (KY); MStar Software R&D, Ltd., Shenzen (TW); MStar France SAS, Issy les Mouineaux (FR); MStar Semiconductor, Inc. (TW)

(*) Notice: Subject to any disclaimer, the term of this patent is extended or adjusted under 35 U.S.C. 154(b) by 504 days.

(21) Appl. No.: 10/590,709

(22) PCT Filed: Feb. 10, 2005

(86) PCT No.: PCT/GB2005/000500

§ 371 (c)(1),
(2), (4) Date: Aug. 25, 2006

(87) PCT Pub. No.: WO2005/084050

PCT Pub. Date: Sep. 9, 2005

(65) Prior Publication Data

US 2007/0197204 A1 Aug. 23, 2007

(30) Foreign Application Priority Data

Feb. 25, 2004 (GB) .............................. 0404194.3

(51) Int. Cl.
*H04M 1/00* (2006.01)
(52) U.S. Cl. .................. 455/552.1; 455/553.1; 455/76; 455/230

(58) Field of Classification Search ............. 455/552.1, 455/553.1, 574, 76, 147, 164.1, 183.1
See application file for complete search history.

(56) References Cited

U.S. PATENT DOCUMENTS

| | | | |
|---|---|---|---|
| 6,219,564 B1* | 4/2001 | Grayson et al. | 455/574 |
| 6,473,607 B1* | 10/2002 | Shohara et al. | 455/343.1 |
| 6,707,822 B1 | 3/2004 | Fadavi-Ardekani et al. | |
| 6,785,352 B1* | 8/2004 | Ranta | 375/354 |
| 6,895,255 B1* | 5/2005 | Bridgelall | 455/552.1 |
| 6,959,201 B2 | 10/2005 | Leprieur et al. | |
| 7,035,596 B2* | 4/2006 | Sato | 455/76 |
| 7,046,649 B2* | 5/2006 | Awater et al. | 370/338 |
| 7,245,725 B1* | 7/2007 | Beard | 380/270 |
| 7,260,068 B2* | 8/2007 | Hsieh et al. | 370/311 |
| 7,362,188 B2* | 4/2008 | Leclercq | 331/60 |

(Continued)

FOREIGN PATENT DOCUMENTS

CN 1400835 A 3/2003

(Continued)

*Primary Examiner*—Duc M Nguyen
(74) *Attorney, Agent, or Firm*—Edell, Shapiro & Finnan, LLC

(57) ABSTRACT

A wireless communications network participant comprising: a plurality of communications subsystems, each subsystem being arranged to transmit and/or receive signals under a different telecommunications standard; means for generating a clock signal; and scheduling means for sending commands to at least one of the subsystems for its or their operation, the scheduling means deducing the timing of the commands relative to the clock signal.

9 Claims, 3 Drawing Sheets

U.S. PATENT DOCUMENTS

| | | | |
|---|---|---|---|
| 7,433,709 B2 * | 10/2008 | Ormson | 455/553.1 |
| 2003/0003951 A1 * | 1/2003 | Leprieur et al. | 455/552 |
| 2003/0157912 A1 * | 8/2003 | Atkinson et al. | 455/234.1 |
| 2003/0169825 A1 * | 9/2003 | Wenzel | 375/260 |
| 2003/0214916 A1 * | 11/2003 | Khawand et al. | 370/278 |
| 2004/0037379 A1 * | 2/2004 | Khlat | 375/345 |

FOREIGN PATENT DOCUMENTS

| | | |
|---|---|---|
| EP | 1 162 754 | 12/2001 |
| EP | 1 213 830 A1 | 6/2002 |
| EP | 1 458 111 A1 | 9/2004 |
| WO | WO 01/86977 A2 | 11/2001 |
| WO | WO 2004/004389 A1 | 1/2004 |

\* cited by examiner

WIRELESS COMMUNICATION DEVICE USING A SINGLE CLOCK SIGNAL AND METHOD OF OPERATING THE SAME

CROSS REFERENCE TO RELATED APPLICATIONS

This application is a national phase application based on international application no. PCT/GB2005/0005000, filed Feb. 10, 2005, which claims the priority of Great Britain Patent Application No. 0404194.3, filed Feb. 25, 2004, the content of which is incorporated herein by reference.

The invention relates to the field of wireless communications. For example, the invention is applicable to the field of mobile telephony.

Technical specifications will differ from one wireless communications network to another. This leads to the problem that a wireless communications device designed to work in one network is unlikely to be compatible with other networks. One approach to ameliorating the compatibility issue is to provide a standard operating scheme for adoption by designers and manufacturers of wireless communications networks. For example, standards such as GSM, AMPS, CDMAOne and UMTS exist in the mobile telephony field. In fact, the mobile telephony field illustrates the situation where several incompatible standards coexist with the result that the compatibility problem, although reduced, is not eliminated. For example, a mobile telephone designed according to the AMPS standard will not work in a GSM network.

In practice, wireless communications networks do not have perfect coverage, i.e. there will be places where a user will find it difficult or impossible to connect to his or her wireless communications network. Even if another network provides adequate coverage to the user's location, the user's device may be incompatible with the other network, as discussed above.

One object of the present invention is to improve the chances of a user being able to connect to a wireless communications network.

According to one aspect, the invention provides a wireless communications network participant comprising: a plurality of communications subsystems, each subsystem being arranged to transmit and/or receive signals under a different telecommunications standard; means for generating a clock signal; and scheduling means for sending commands to at least one of the subsystems for its or their operation, the scheduling means deducing the timing of the commands relative to the clock signal. Typically, these commands cause the subsystem(s) to begin, modify or stop performing certain processes.

Thus, the invention provides a system which can operate under several standards, thereby facilitating connection by a user to a number of wireless communications networks, with the result that the chances of a wireless communications device being used successfully are enhanced.

Furthermore, the invention advantageously permits a single timing signal within the wireless communications network participant to be used for interacting with networks organised according to different standards so that separate timing signals do not need to be generated for use with different standards. Moreover, where the wireless communications network participant switches from interacting with a network organised according to one standard to interacting with a network organised according to another standard, the use of a single timing signal allows the switchover to be implemented efficiently as the timings required under the different standards are reckoned relative to the same clock signal.

In one embodiment, the process of determining how the timing of operations of the wireless communications network participant should be controlled relative to the timing signal in order to permit the participant to interact with a target unit involves producing an offset indicating a timing offset between a point in the timing signal and a corresponding point in a notional timing signal formatted for communicating between the participant and the target unit.

The wireless communications network participant may be, for example, a mobile telephone. The target units interacting with the wireless communications device may be, for example, basestations in a mobile telephony network. Two of the standards used by the subsystems may be, for example, the UMTS and GSM standards.

By way of example only, certain embodiments of the invention will now be described with reference to the accompanying figures, in which.

Figure 1:
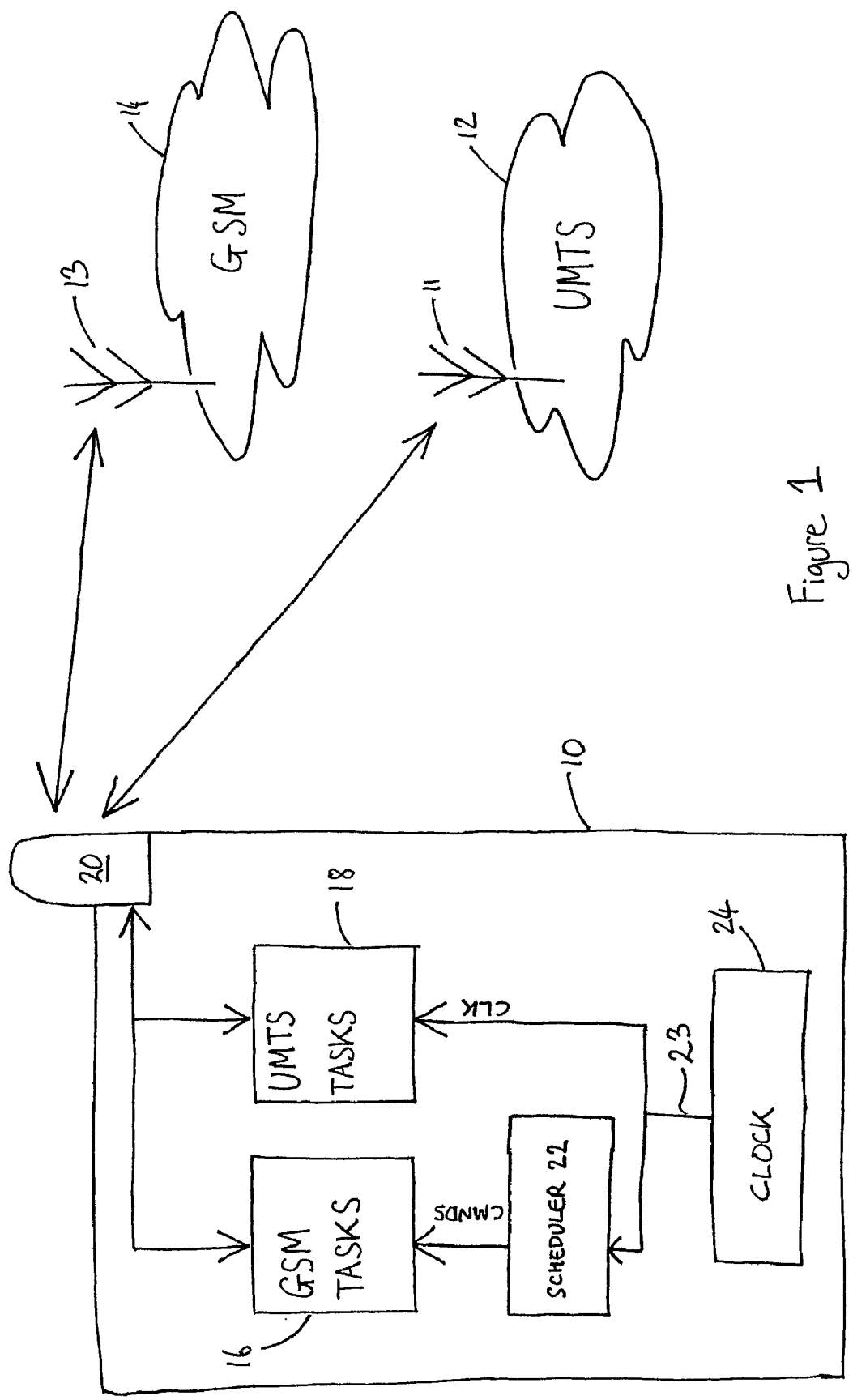
FIG. 1 shows, schematically, a dual band mobile telephone interacting with a GSM network and a UMTS network.

FIG. 1 shows a mobile telephone 10 which is capable of interacting with basestations, such as 11 and 13, in a mobile telephone network 12 organised according to the UMTS standard and in a mobile telephone network 14 organised according to the GSM standard. The structure of the mobile telephone 10 is not shown in detail in FIG. 1 which schematically illustrates only the processes within the telephone that contribute towards the invention.

As shown in FIG. 1, the mobile telephone 10 comprises a GSM subsystem 16 for performing the processing operations that are necessary when communicating with a GSM network, such as network 14. The mobile telephone 10 also comprises a UMTS subsystem 18 for performing the processing operations that are necessary when communicating with a UMTS network, such as network 12. Each of the processing subsystems 16 and 18 is configured to generate signals for transmission from an antenna 20 of the telephone 10 and also to process signals received by the telephone 10 through the antenna 20. The subsystems 16 and 18 share some of the hardware of the telephone 10, including a clock 24.

The scheduling and timing of tasks performed by the processing subsystems 16 and 18 are controlled, ultimately, by a clock signal 23 provided by the clock 24. Clock 24 contains a crystal oscillator for the purpose of generating the clock signal 23. The crystal oscillator is arranged such that the clock signal 23 is at the frequency required by the UMTS subsystem 18 to perform UMTS tasks. Thus, when the telephone 10 is communicating with a UMTS basestation, the UMTS subsystem 18 times and schedules UMTS tasks by using the clock signal 23 directly.

The clock signal 23 conforms to the UMTS standard so it cannot be used directly in the control of GSM operation of the mobile telephone 10 because the GSM standard demands a clock signal at a different frequency. To allow GSM tasks to be performed with the correct timing, the telephone 10 contains a scheduler 22 that interacts with the clock signal 23. The scheduler 22 uses the clock signal 23 as a reference signal to calculate the moments when certain actions must be begun or stopped by the GSM subsystem 16. Based on the calculated event timings, the scheduler can send commands to the GSM subsystem 16 to cause GSM tasks to be carried out at the correct times. Thus, the GSM tasks are not controlled directly by a master clock signal but on the contrary the GSM subsystem 16 receives commands to perform the required GSM tasks at the correct times.

The operation of the subsystems 16 and 18 and the scheduler will now be described with reference to FIG. 2.

Figure 2:
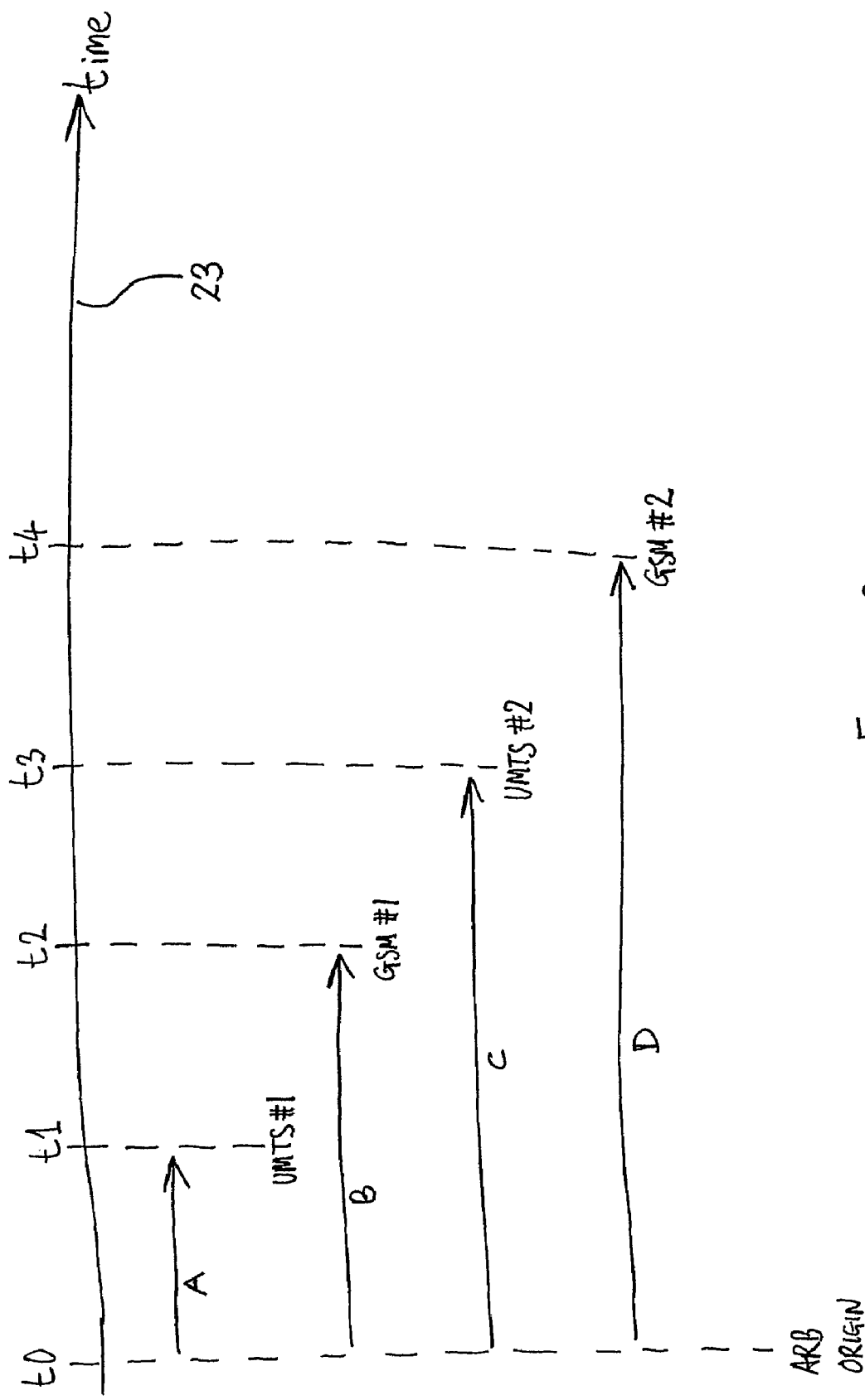
FIG. 2 is a timing diagram illustrating the operation of the mobile telephone of FIG. 1.

FIG. 2 illustrates the clock signal 23 extending forward in time from an arbitrary origin t0. FIG. 2 illustrates a situation where the mobile telephone 10 can acquire signals from four basestations in its vicinity. Two of these basestations form part of a UMTS network and are labelled UMTS#1 and UMTS#2. The other two of these basestations form part of a GSM network and are labelled GSM#1 and GSM#2.

For the purposes of this example, it is assumed that the mobile telephone 10 is initially operating in the UMTS mode and that it first establishes a link to UMTS#2. The UMTS core 18 determines that the boundary of the frame structure of the signals from basestation UMTS#2 occurs at time t3. Therefore, the UMTS subsystem 18 records offset C indicating the position of t3 relative to t0 so that the UMTS subsystem 18 has a record of the frame structure of the signals of basestation UMTS#2. At some subsequent time, if the mobile telephone is required to interact with basestation UMTS#2, the appropriate UMTS task can be scheduled to commence at the appropriate time by taking offset C into account. In a similar way, the UMTS subsystem 18 can acquire signals from basestation UMTS#1 and determine an offset A indicating the position t1 of the boundary of the frame structure of the signals from the basestation UMTS#1 relative to the arbitrary origin t0 of clock signal 23. Likewise, the GSM subsystem 16 can acquire signals from basestations GSM#1 and GSM#2 and process them under commands from the scheduler 22 to determine offsets B and D indicating the boundaries t2 and t4 of the frame structures of the signals from GSM#1 and GSM#2 respectively relative to the arbitrary origin t0 of the clock signal 23.

When linked to basestation UMTS#2, the telephone 10 will monitor the other basestations UMTS#1, GSM#1 and GSM#2 in the vicinity. Primarily, this monitoring is done to determine whether better communications can be achieved (e.g. with fewer errors) by using a communications link to a different basestation.

Figure 3:
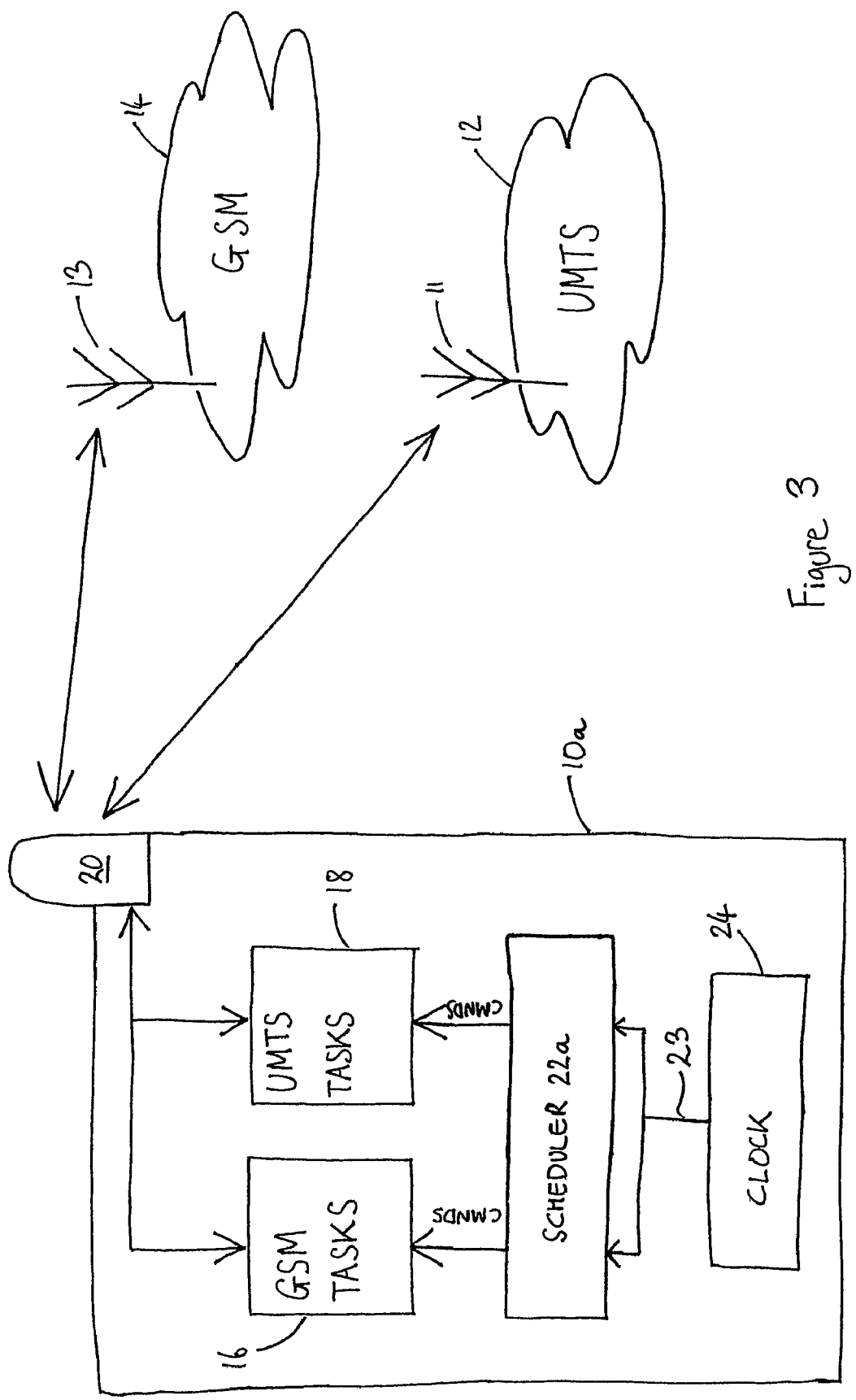
FIG. 3 shows, schematically, a modified version of the telephone of FIG. 1.

FIG. 3 shows a modified version 10a of the telephone of FIG. 1. In FIG. 3, the clock signal is abstracted from the telecommunications standards used by the subsystems 16 and 18 and a modified scheduler 22a uses the clock signal to deduce event timings for controlling both the UMTS subsystem 18 and the GSM subsystem 16. The clock signal 23 must be of sufficiently high frequency so that it can accurately time its issuing of commands to the UMTS and GSM subsystems within the timing error tolerances of those standards. In this example, the clock 24 produces a signal at 19.2 MHz, which simplifies the calculation of event times by the scheduler 22a because it is 5 times the UMTS chip rate and 86 times the 200 kHz radio channel spacing used in GSM.

The invention claimed is:

1. A wireless communications network device comprising:
   a plurality of communications subsystems, each subsystem being arranged to transmit and/or receive signals under a different telecommunications standard;
   a single clock for generating a single timing signal; and
   a scheduler for sending commands to at least one of the subsystems for its or their operation, the scheduler deducing the timing of the commands relative to the single timing signal.

2. A device according to claim 1, wherein several subsystems each receive commands from the scheduler on the basis of the single timing signal.

3. A device according to claim 1, wherein the single timing signal is matched to at least one of the subsystems and the or each matched subsystem is arranged to utilize the single timing signal without the intermediary of the scheduler.

4. A device according to claim 1, wherein one of said subsystems is a GSM subsystem and another is a UMTS subsystem.

5. A device according to claim 1, wherein the device is configured to determine and record offsets between a first time of the single timing signal and a time of respective boundaries of frame structures of signals received from different base stations.

6. A wireless communications network device comprising:
   a clock configured to generate a single clock signal;
   a plurality of communications subsystems, each subsystem being arranged to transmit and/or receive signals under a different telecommunications standard; and
   a scheduler for sending commands to at least one of the subsystems for its or their operation, the scheduler receiving the single clock signal and deducing the timing of the commands relative to the single clock signal,
   wherein at least one of the subsystems receives the single clock signal directly from the clock without interaction with the scheduler.

7. A device according to claim 6, wherein several subsystems each receive commands from the scheduler on the basis of the single clock signal.

8. A device according to claim 6, wherein one of said subsystems is a GSM subsystem and another is a UMTS subsystem.

9. A device according to claim 6, wherein the device is configured to determine and record offsets between a first time of the single timing signal and a time of respective boundaries of frame structures of signals received from different base stations.

* * * * *

UNITED STATES PATENT AND TRADEMARK OFFICE
CERTIFICATE OF CORRECTION

| | | |
|---|---|---|
| PATENT NO. | : 7,689,246 B2 | Page 1 of 1 |
| APPLICATION NO. | : 10/590709 | |
| DATED | : March 30, 2010 | |
| INVENTOR(S) | : Eugene Pascal Herczog and Nigel Gow Paton | |

It is certified that error appears in the above-identified patent and that said Letters Patent is hereby corrected as shown below:

On the Title page of the patent, (73) Assignees: replace the following:

"MStar Software R&D, Ltd., Shenzen (TW)
        MStar France SAS, Issy les Mouineaux (FR)"

with the following:

--MStar Software R&D, Ltd., Shenzhen (CN)
        MStar France SAS, Issy les Moulineaux (FR)--

Signed and Sealed this

Fifth Day of October, 2010

David J. Kappos
*Director of the United States Patent and Trademark Office*